(12) United States Patent  
Fetz et al.

(10) Patent No.: US 6,494,231 B1
(45) Date of Patent: Dec. 17, 2002

(54) VALVE DEVICE

(75) Inventors: Dietmar Fetz, Lustenau (AT); Hannes Hausbichler, Bregenz (AT)

(73) Assignee: EDF Polymer-Applikation Maschinenfabrik GmbH, Horbranz (AT)

(*) Notice: Subject to any disclaimer, the term of this patent is extended or adjusted under 35 U.S.C. 154(b) by 0 days.

(21) Appl. No.: 09/806,113

(22) PCT Filed: Oct. 19, 1999

(86) PCT No.: PCT/EP99/07936

§ 371 (c)(1),
(2), (4) Date: Mar. 28, 2001

(87) PCT Pub. No.: WO00/23180

PCT Pub. Date: Apr. 27, 2000

(30) Foreign Application Priority Data

Oct. 21, 1998 (DE) .......................... 198 48 358

(51) Int. Cl.[7] ........................... B01F 15/02; F16K 11/22
(52) U.S. Cl. ..................... 137/868; 137/906; 251/335.2
(58) Field of Search ................. 137/867, 868, 137/906; 251/335.2

(56) References Cited

U.S. PATENT DOCUMENTS

| 2,075,600 | A | * | 3/1937 | Baker ................... 137/868 |
| 3,386,623 | A | * | 6/1968 | Berrill et al. ............. 137/868 |
| 3,583,439 | A | | 6/1971 | Dolenz et al. |
| 4,037,758 | A | | 7/1977 | Bourque |
| 4,323,004 | A | | 4/1982 | Sereda et al. |
| 4,688,944 | A | | 8/1987 | Mementhaler |
| 4,809,737 | A | | 3/1989 | Mumenthaler |
| 5,730,359 | A | * | 3/1998 | Wurth .................. 239/66 |

FOREIGN PATENT DOCUMENTS

| DE | 2 004 661 | 8/1971 |
| DE | 36 30 910 | 3/1988 |
| DE | 195 42 797 | 5/1997 |

* cited by examiner

Primary Examiner—John Fox
(74) Attorney, Agent, or Firm—Fay, Sharpe, Fagan, Minnich & McKee

(57) ABSTRACT

A valve device for low-viscosity to high-viscosity fluids, especially for fluid plastic components of plastic mixtures consisting of one or more components, with a valve housing having a fluid inflow and a dosaging valve, which has a dosing nozzle that can optionally be closed or opened by a closing element, as well as a pressure control device which acts on the fluid in the fluid inflow.

4 Claims, 4 Drawing Sheets

VALVE DEVICE

BACKGROUND OF THE INVENTION

This application claims priority of German Application Serial No. 198 48 358.9 filed Oct. 21, 1998, and PCT/DE99/07936 filed Oct. 19, 1999.

The invention relates to a valve device for low-viscosity to high-viscosity fluids, especially for fluid plastic components of plastic mixtures consisting of one or more components. The device includes a valve housing having a fluid inflow and a dosing valve. The dosing valve has a dosing nozzle that can optionally be closed or opened by a closing element, as well as a pressure control device which acts on the fluid in the fluid inflow.

Such valve devices are used particularly in the processing of plastics with mixing heads, with the help of which the different plastic components are mixed and then ejected as a processable plastic mixture through an outlet and, for example, are immediately moulded onto a part as a seal. The valve devices are arranged at the inlets of the mixing head for the individual plastic components and serve to stop the supply of a component when the dosing valve is closed. The valve devices ensure, when the dosing valve is opened, that the supplied component is introduced into the mixing head not only with a constant volume flow, but also with a previously set, constant fluid pressure.

A valve device according to the above-mentioned type is known from DE-OS 195 42 797. With this valve device, the pressure control device is formed essentially from a compression spring which is arranged in the housing. The compression spring acts on the closing element which is formed as a valve needle. The compression spring pretension can be adjusted manually by adjusting an adjusting screw from the outside of the housing. The fluid pressure exerted by the spring on the nozzle needle is in equilibrium with the fluid pressure. The fluid pressure acts on the frontal area of the nozzle needle which lies transversely to its shift direction. The pressure of the spring and the pressure exerted on the nozzle needle due to the fluid pressure are in equilibrium when operated, so that it is possible to control the fluid pressure in the fluid inflow by adjusting the spring pretension.

The '797 device is relatively complicated with regard to the adjustment of the correct pressure ratios in the fluid inflow. The adjustment of the correct pressure ratios takes place manually from the outside of the housing. Small adjustments of the adjusting screw result in relatively large pressure changes in the fluid, as the effective frontal area at the nozzle needle, which transfers the spring force to the fluid, is small due to its design. A particular disadvantage of the known device is that an operation at a constant fluid pressure, with the volume flow supplied by a dosing pump, is only guaranteed as long as the nozzle needle maintains its relative position in the valve housing when the valve is open. If the cross section that is opened by the nozzle needle is reduced in this relative position, for example by deposits of solidified plastic components or other build-up of material, the nozzle needle has to be opened further against the force of the spring, so as to maintain the steady cross section which is necessary for the constant volume flow of the fluid. A small movement of the nozzle needle already results in a large change in the spring tension and the spring force, so that the fluid pressure increases by a large amount, even when only a small build-up of material occurs.

SUMMARY OF THE INVENTION

It is the object of the invention to avoid the aforementioned disadvantages and to design a valve device of the above-mentioned type in such a way that a constant fluid pressure can be adjusted easily. The fluid pressure is essentially independent of the position of the closing element when the dosing valve is opened, and therefore is also maintained when contaminations occur at the nozzle cross section.

This object will be solved by means of the invention in that the pressure control device consists essentially of a pneumatically pretensionable control membrane which acts on the closing element.

The use of a pneumatically or servo-pneumatically pretensionable control membrane, which replaces the compression spring used in the state of the art, allows a particularly simple pressure control of the fluid dosed by means of the device. The air pressure for changing the membrane pretension can easily be adjusted automatically. By using a suitable pressure accumulator for the compressed air which pretentions the membrane, movements of the closing element which arise from contaminations at the nozzle outlet, result in practically no or only a negligible increase of pressure of compressed air and subsequently no change of the fluid pressure. In particular, the design of the valve device according to the invention also facilitates its automatic control by means of a computer-aided adjustment or change of the air pressure acting on the control membrane.

In a preferred design of the invention, there can also be arranged a recirculation valve in the valve housing in such a way that the dosing valve is optionally opened for the supply of fluid to a processing device or the recirculation valve is opened for the return of the fluid to a storage vessel. With this configuration, the supplied fluid is either supplied to for example the mixing head by the dosing valve of the processing device, or is conveyed in the cycle back to the storage vessel by the recirculation valve. The compact unit of dosing and recirculation valve in a common housing avoids difficulties in the starting phase of the subsequent processing device, as this is always completely filled due to the circulation of fluid in the cycle, and fresh fluid is always added as soon as the dosing valve opens.

The control membrane is preferably part of a pneumatically chargeable pressure control chamber and acts on the closing element designed as a valve needle by means of a plunger which can be moved in the housing. The pressure control chamber thereby forms the pressure storage for the compressed air which acts on the fluid in the fluid inflow by means of the control membrane. The force exerted by the compressed air is transferred to the valve needle by means of the plunger essentially without friction losses. The pressure control device is preferably arranged separately from the fluid inflow by means of a shut-off membrane, whereby it is ensured that no fluid can reach the sensitive control membrane. The shut-off membrane is preferably arranged between the closing element and the plunger, so that the plunger is also separated from the fluid inflow and that its very accurate, mainly frictionless mounting in the valve housing is not adversely affected by the entry of fluid.

The plunger can be charged by the control membrane by means of a pressure pin mounted at the control membrane, which is supported at the plunger by means of a ball bearing element. The ball bearing element, which preferably consists simply of a single ball, effects an even central transfer of the forces acting between the plunger and the pressure pin essentially without friction losses, so that an exact pressure balance can take place between the air pressure at the control membrane and the fluid pressure in the fluid inflow.

The closing element is preferably pretensioned in the direction of the plunger by means of a spring which is supported in the housing. When the dosing valve is opened, the spring draws the dosing element in the dosing nozzle back at least to such an extent that the fluid pressure of the supplied fluid can act on the closing element. The closing element of the dosing valve can be moved by an actuating device for closing or opening the dosing nozzle. The actuating device consists in a particularly advantageous manner essentially of an actuating lever that can be actuated in the actuating cylinder. The actuating lever is mounted pivotally in the housing and acts on the closing element or the pressure cylinder against the spring. In particular, with the particularly advantageous design of the invention, in which the recirculation valve and the dosing valve are constructed essentially in the same way, it is possible that the dosing valve and the recirculation valve or their closing elements can be actuated by a common actuating lever.

BRIEF DESCRIPTION OF THE DRAWINGS

Further characteristics and advantages of the invention result from the following description and the drawing, wherein a preferred embodiment of the invention is explained in detail. It shows.

DESCRIPTION OF PREFERRED
EMBODIMENTS OF THE INVENTION

Figure 1:
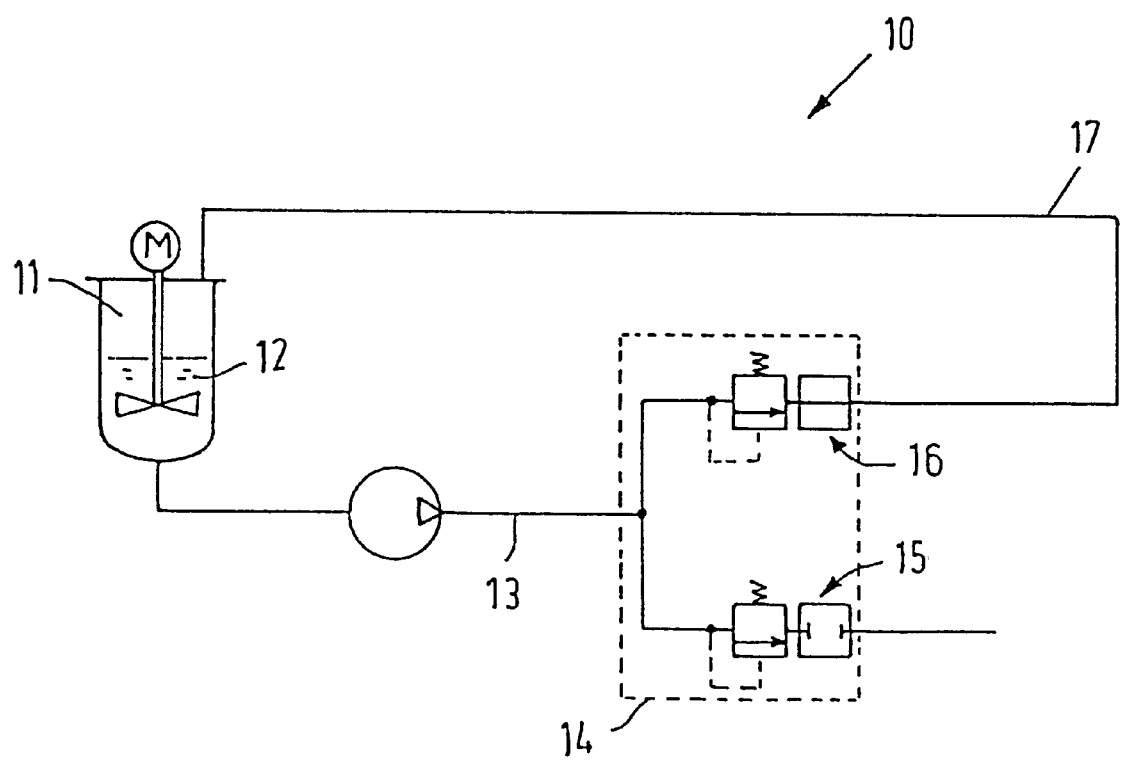
FIG. 1 is a flow sheet for illustrating the preferred use of a valve device according to the invention.

FIG. 1 shows a flow sheet of a part of a plastics processing device 10 with a mixing container 11 for a plastic component 12 to be processed, which is either supplied to a mixing head for plastic mixtures, not shown in detail, by means of a dosing valve 15 via a conduit 13 and a valve device 14, or is pumped back to the storage vessel 11 in the cycle via a second conduit 17 by means of a recirculation valve 16.

Figure 2:
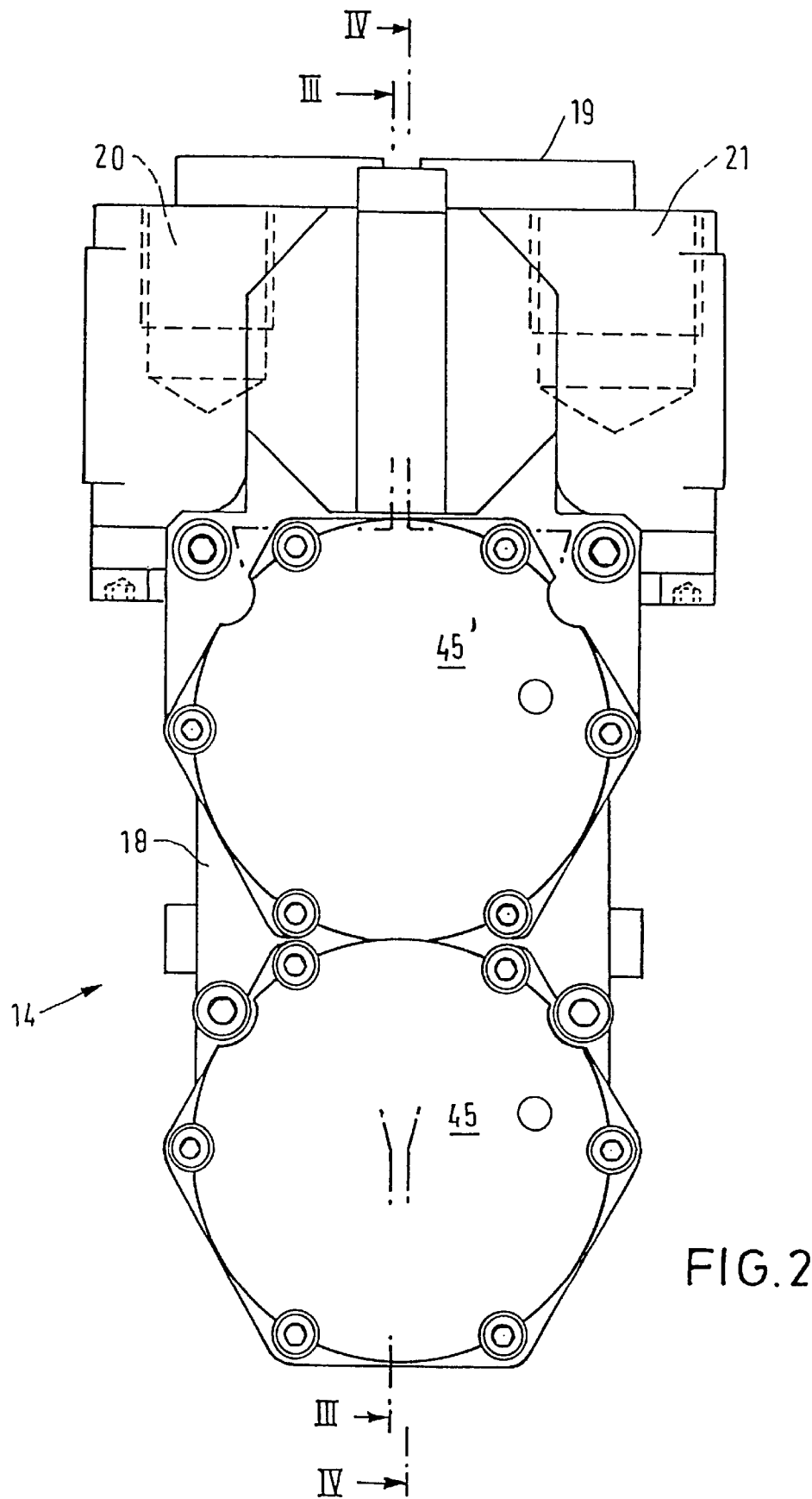
FIG. 2 is a valve device according to the invention in a top view.
Figure 3:
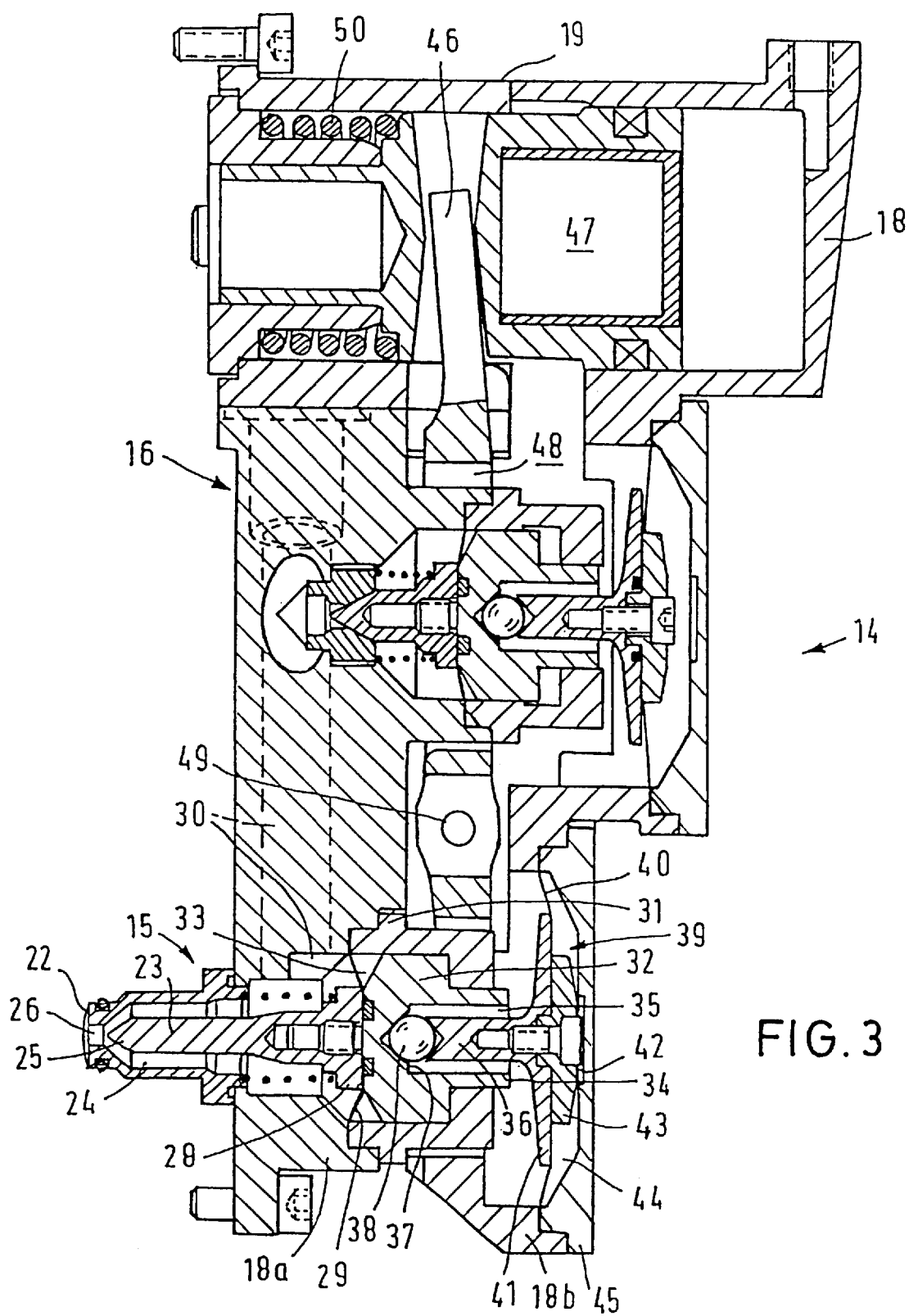
FIG. 3 is the object of FIG. 2 in a section along line III—III with an opened dosing valve.
Figure 4:
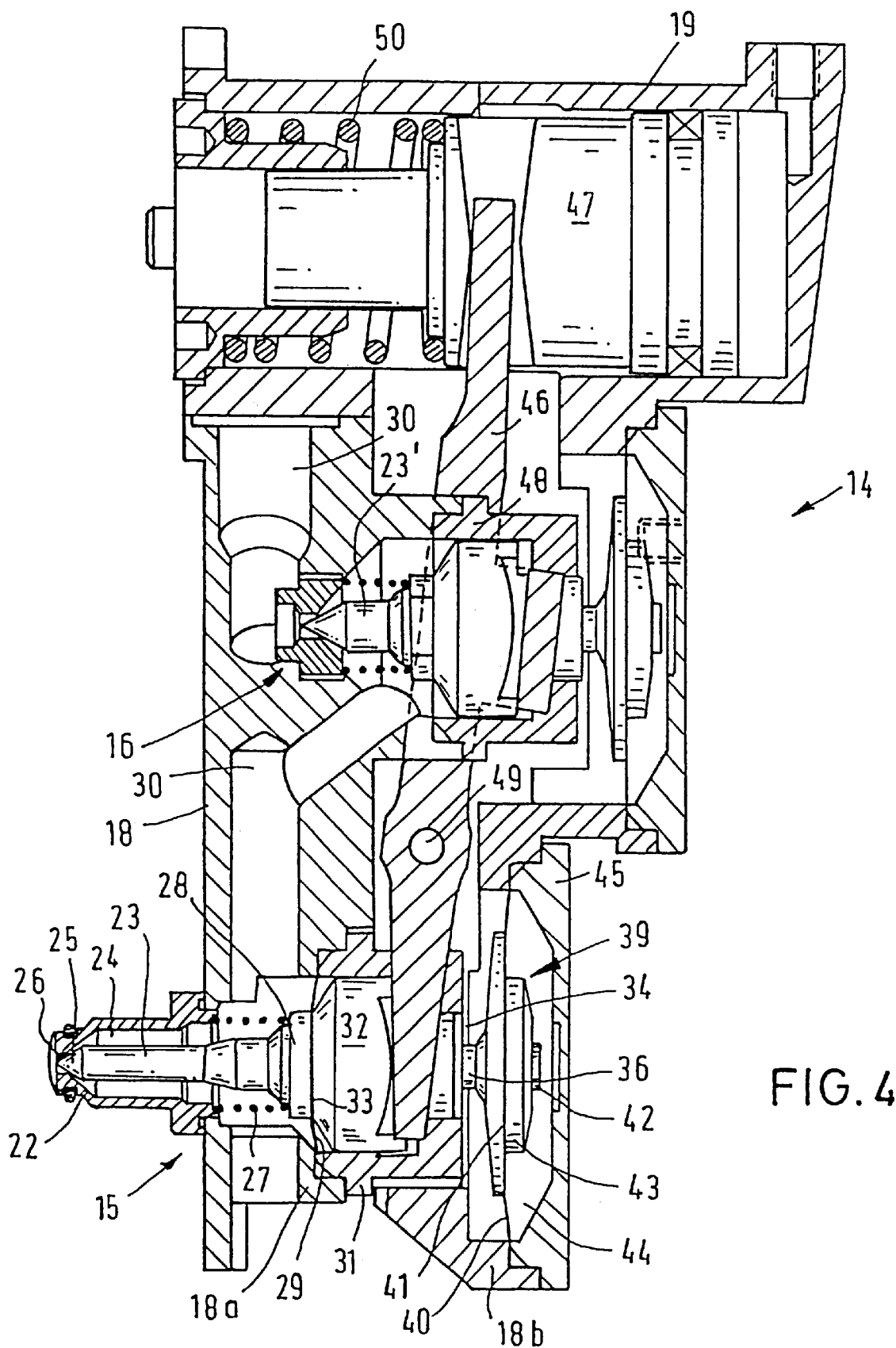
FIG. 4 is the object of FIG. 2 in a section along line IV—IV with an opened recirculation valve.

The valve device 14 is depicted in FIGS. 2–4. It consists essentially of a valve housing 18, in which are arranged the dosing valve 15 and the recirculation valve 16. A fluid inflow 20 and a return connector 21 for connecting the conduits 13 or 17 are provided at the upper side 19 of the housing, whereas a fluid outlet 22 is provided at the lower end of the housing, from which the plastic fluid is injected into the mixing head of the plastic processing device.

The dosing valve 15 and the recirculation valve 16 are essentially constructed in the same way, so that only the dosing valve will be described in detail. It consists essentially of a valve needle 23 which forms a closing element for the fluid outlet. The valve needle 23 is received axially moveable in a channel 24 which is arranged in the outlet 22, and which closes the opening 26 of the outlet when its tip 25 is moved in a forward position (to the left in the drawing) and opens it in the pushed-back position. To facilitate the opening of the valve needle 23, there is arranged a small helical spring 27 in the channel, which is pretensioned when the valve is closed and then endeavours to move the needle into the open position of the valve.

The valve needle 23 is mounted to a shut-off membrane 29 with its head at the back (to the right in the drawing) which separates the channels 30 for the fluid inflow to the outlet 22 or for the return of the other valve units. The shut-off membrane is clamped between a part 18e of the valve housing and a cylinder element 31, which is threaded therein and can extend in the axial direction of the valve needle to such an extent, that it does not prevent or limit a movement of the needle 23 from its closed to its opened position.

On the other side of the shut-off membrane 29, which does not carry any fluid, a plunger 32 is moveably arranged in the cylinder element 31. The cylinder element is adjacent to the plunger's front side 33 by means of the intermediate shut-off membrane 29 against the head 28 of the valve needle. A central bore 35 is provided at the back side 34 of the plunger 32. The central bore receives a pressure pin 36, which is supported on the base 37 of the bore by means of a ball 38 at the plunger.

The pressure pin 36 is provided with a clamping device 39 for a control membrane 40 at its rear end. The control membrane consists of a first clamping plate 41 and a second clamping plate 43 which is threaded to the first plate by means of a central screw 42. The control membrane 40 is clamped between the first and second plates in a sealing manner. The control membrane is part of a pneumatically chargeable pressure chamber 44. At the edge, the pressure chamber is clamped in an airtight manner between a part 18b of the valve housing and a pressure chamber lid 45. The pressure chamber comprises a connector for compressed air, not shown in detail, which is controlled by means of an external supply of compressed air.

The recirculation valve is constructed essentially identical to the dosing valve, but the valve needle 23' of the recirculation valve 16 is shorter than that of the dosing valve. The recirculation valve serves to connect the fluid inflow 20 in the open nozzle needle position to the return 21. Alternatively, the recirculation valve can stop a fluid return along the second conduit 17 in the closed position of the valve, so as to eject the entire supplied fluid into the mixing chamber by means of the dosing valve which is then opened.

The switching of the two valves in the housing is effected by means of a common switching device. The switching device can be pivoted essentially by means of a switching lever 46 which is mounted pivotally in the housing. The switching lever can be pivoted by an actuating cylinder 47 which is arranged in the upper part of the valve housing 18, and thereby moves the valves simultaneously in such a way that one valve will be closed when the other valve will be opened. The arrangement is in such a way that the switching lever presses, when the recirculation valve is closed. When the dosing valve is opened, as shown in FIG. 3, the actuating lever 48 which surrounds the plunger of the recirculation valve 16 lying above the pivot axis 49, presses the valve needle 23' of the recirculation valve into the closed position, while the lower end of the switching lever 46 has no contact with the plunger of the dosing valve, so that the valve needle is pressed back into the housing by means of the spring 27 and opens the opening 26. When switching over into the recirculation mode as shown in FIG. 4, the pressure in the actuating cylinder 47 is reduced, whereby an actuating spring 50 turns the switching lever 46, whereby the actuating lever 48 disengages from the plunger of the recirculation valve on the one hand and opens the valve needle 23', and on the other hand the switching lever presses the plunger of the dosing valve forward with its lower end (to the left in the drawing) and closes the valve.

It is obvious that, when the dosing valve 15 is opened, neither the pressure spring nor the switching lever act on the nozzle needle or the plunger, and the closing element is supported at the control membrane by means of the plunger and the pressure pin practically unaffected by mechanical influences. This also means that the pressure of the fluid flowing through the valve device is in equilibrium with the pneumatic pressure in the pressure chamber 44, that is, mainly unaffected by the position of the nozzle needle and the piston in the valve housing, as movement of the plunger in the axial direction and thereby a squeezing of the control membrane into the pressure chamber only effects a small change in volume, and the pressure increase, which theoretically takes place is so small that it can be neglected as being negligibly small. The theoretical pressure increase in the pressure chamber charged with air decreases with the increase of the entire volume of the cycle of compressed air, into which the pressure chamber is bound. As the air pressure in the pressure chamber is controlled automatically, the volume of the pressure chamber is in these cases without particular importance for the pressure increase in the air and therefore in the fluid.

This particular design makes it possible with the valve device according to the invention to ensure a constant fluid pressure in the supplied plastic component independently of the position of the nozzle needle in the housing. If soilings of the dosing valve or of the recirculation valve should occur in the region of their openings 26, which reduce the cross section in this region, the nozzle needle can move further backwards, whereby the original cross section is reproduced without an increase in the fluid pressure. The fluid pressure can be changed very easily and accurately by changing the air pressure in the pressure chamber, so that the valve device according to the invention is very suitable for an automatic control or adjustment of the fluid pressure, which can take place by means of a suitable control device, for example a control (SPS), which can be programmed in a memory.

The mechanical coupling of both valves by means of the common control lever guarantees that both valves are always actuated at the same time. When one valve is opened, the other valve is always in its closed position, so that a wrong operation (for example two closed valves) is safely excluded.

Having thus described the invention, it is claimed:

1. A valve device for low-viscosity to high-viscosity fluids, in particular for fluid plastic components of plastic mixtures having single or multiple components, with a valve housing having a fluid inflow and a dosing valve, which comprises a dosing nozzle that can optionally be closed or opened by means of a closing element, as well as a pressure control device which influences said fluid in said fluid inflow, which consists essentially of a pneumatically pretensionable control membrane which acts on said closing element, wherein said pressure control device is arranged separately from said fluid inflow or the passages holding said fluid in said valve housing by means of a shut-off membrane, said control membrane is part of a pneumatically chargeable pressure control chamber and acts on said closing element formed as a valve needle by means of a plunger which is moveable in said housing, said plunger is charged by said control membrane by means of a pressure pin which is mounted on said control membrane, said pin is supported at said plunger by means of a ball bearing element, said closing element is pretensioned by a spring which is supported in said housing in the direction of said plunger, said closing element of said dosing valve can be moved by means of an actuating device for closing or opening said dosing nozzle, said actuating device essentially consists of a control lever which can be actuated by an actuating cylinder, which is mounted pivotally in said housing, which acts on said closing element or a plunger against said spring, said dosing valve and said recirculation valve or their respective closing elements can be actuated by said control lever.

2. The valve device of claim 1, wherein a recirculation valve is additionally arranged in said valve housing, so that said dosing valve is optionally opened for the supply of fluid to a processing device or said recirculation valve is opened for the return of said fluid to a storage vessel.

3. The valve device of claim 2, wherein said recirculation valve and said dosing valve are constructed in essentially the same way.

4. The valve device of claim 1, wherein said shut-off membrane is arranged between said closing element and said plunger.

* * * * *